United States Patent
Shimizu

(10) Patent No.: US 11,575,797 B2
(45) Date of Patent: Feb. 7, 2023

(54) IMAGE READING AND FORMING APPARATUS WITH STREAK CORRECTION BASED ON IMAGE READING MODE

(71) Applicant: CANON KABUSHIKI KAISHA, Tokyo (JP)

(72) Inventor: Hiromu Shimizu, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/673,505

(22) Filed: Feb. 16, 2022

(65) Prior Publication Data

US 2022/0272206 A1 Aug. 25, 2022

(30) Foreign Application Priority Data

Feb. 22, 2021 (JP) .................... JP2021-026679

(51) Int. Cl.
*H04N 1/00* (2006.01)
*H04N 1/60* (2006.01)
*H04N 1/409* (2006.01)

(52) U.S. Cl.
CPC ..... *H04N 1/00013* (2013.01); *H04N 1/00005* (2013.01); *H04N 1/00018* (2013.01); *H04N 1/00023* (2013.01); *H04N 1/00037* (2013.01); *H04N 1/00588* (2013.01); *H04N 1/00604* (2013.01); *H04N 1/4097* (2013.01); *H04N 1/60* (2013.01)

(58) Field of Classification Search
None
See application file for complete search history.

(56) References Cited

U.S. PATENT DOCUMENTS

| | | | | |
|---|---|---|---|---|
| 7,253,932 B2* | 8/2007 | Tsutsumi | ........... | H04N 1/00002 358/448 |
| 8,508,803 B2* | 8/2013 | Hayashi | ............... | H04N 1/4097 358/453 |
| 8,548,204 B2* | 10/2013 | Ikubo | .................... | G06V 10/98 358/453 |
| 9,313,353 B2* | 4/2016 | Depalov | ............ | H04N 1/00909 |
| 10,129,415 B2* | 11/2018 | Morikawa | ............. | H04N 1/193 |
| 10,356,252 B2* | 7/2019 | Koyama | ................ | H04N 1/401 |
| 10,356,269 B2 | 7/2019 | Shimizu | ............. | H04N 1/00708 |
| 10,616,428 B2 | 4/2020 | Shimizu | ............. | H04N 1/00005 |

(Continued)

OTHER PUBLICATIONS

U.S. Appl. No. 17/681,643, filed Feb. 25, 2022.

*Primary Examiner* — Scott A Rogers
(74) *Attorney, Agent, or Firm* — Venable LLP

(57) ABSTRACT

An image reading apparatus includes an original tray on which an original is to be stacked; a conveyance unit configured to convey the original stacked on the original tray; a reading unit including a reading sensor having a light receiving element to receive light of a first color and a light receiving element to receive light of a second color that is different from the first color, wherein the reading unit is configured to read an image of the original conveyed by the conveyance unit by using the reading sensor to generate image data which represents a reading result of the reading unit; at least one processor configured to: determine a first abnormal position which is a position in a first direction of an abnormal pixel of the first color in the image represented by the image data, wherein, in the image represented by the image data.

10 Claims, 11 Drawing Sheets

(56) References Cited

U.S. PATENT DOCUMENTS

| | | | |
|---|---|---|---|
| 10,764,461 B2 | 9/2020 | Shimizu | H04N 1/00771 |
| 10,897,552 B2 | 1/2021 | Shimizu | H04N 1/00713 |
| 11,172,089 B2 | 11/2021 | Shimizu | H04N 1/00713 |
| 2018/0176400 A1 | 6/2018 | Shimizu | H04N 1/00737 |
| 2022/0272228 A1* | 8/2022 | Tanaka | H04N 1/409 |
| 2022/0294925 A1* | 9/2022 | Matsumura | H04N 1/00082 |

* cited by examiner

IMAGE READING AND FORMING APPARATUS WITH STREAK CORRECTION BASED ON IMAGE READING MODE

BACKGROUND OF THE INVENTION

Field of the Invention

The present disclosure relates to an image reading apparatus configured to read an image of an original and an image forming apparatus having the image reading apparatus.

Description of the Related Art

An image reading apparatus configured to read an image of an original which is conveyed one by one by an auto document feeder (hereinafter, "ADF") is known. Japanese Patent Application Laid-open No. 2001-285595 discloses the image reading apparatus of this type. In this image reading apparatus, the ADF is conveys the document so as to pass on the platen arranged at the reading position of the image reading apparatus. The image reading apparatus irradiates the original passing over the platen with light from a light source, then, the image reading apparatus receives the reflected light by an image pick up element to convert it into an electrical signal to thereby read the image of the original.

Opportunities to read and digitize images of forms, such as invoices, using the image reading apparatus are increasing. In order to digitize many forms, there is an increasing demand for feeding forms using the ADF. When the original is fed using the ADF, dust (foreign matter), such as paper dust caused by the original itself or toner peeled off from the original, may adhere to the platen which is arranged at a reading position. When reading the image with the foreign matter on the platen, the irradiation light and the reflected light are blocked by the foreign matter. Thus, a vertical line (streak image) appears at a position of the foreign matter in an image (reading image). In many cases, the image reading apparatus has a streak image correcting function for erasing such streak images.

When the streak image overlaps with a character on the original, the character in the reading image may also be deleted by the streak image correction. Especially when reading the image such as the form, erasing the character causes unfavorable results for the user. However, if the streak image correction is not performed at all, the streak image remains in the reading image, which makes it difficult for the user to recognize characters from the reading image. In view of the above mentioned problems, the present disclosure is directed to provide an image reading apparatus which appropriately corrects the streak image generated by the foreign matter on the reading position.

SUMMARY OF THE INVENTION

An image reading apparatus according to the present disclosure includes: an original tray on which an original is to be stacked; a conveyance unit configured to convey the original stacked on the original tray; a reading unit including a reading sensor having a light receiving element to receive light of a first color and a light receiving element to receive light of a second color that is different from the first color, wherein the reading unit is configured to read an image of the original conveyed by the conveyance unit by using the reading sensor to generate image data which represents a reading result of the reading unit; at least one processor configured to: determine a first abnormal position which is a position in a first direction of an abnormal pixel of the first color in the image represented by the image data, wherein, in the image represented by the image data, the first direction is a direction which intersects a second direction corresponding to a conveyance direction in which the original is conveyed; determine a second abnormal position which is a position in the first direction of an abnormal pixel of the second color in the image represented by the image data; perform a correction processing for removing a streak image by correcting the image data; wherein the at least one processor is configured to: operate in a first reading mode in which the correction processing to the image data of the first color corresponding to the first abnormal position in the image represented by the image data and the correction processing is performed, regardless of presence or absence of the abnormal pixel of the second color, to the image data of the second color corresponding to the first abnormal position in the image represented by the image data; and operate in a second reading mode in which the correction processing is performed to the image data of the first color corresponding to the first abnormal position in the image represented by the image data and the correction processing is not performed to the image data of the second color corresponding to the first abnormal position in the image represented by the image data in a case where the abnormal pixel of the second color is not in the first abnormal position.

Further features of the present invention will become apparent from the following description of exemplary embodiments (with reference to the attached drawings).

DESCRIPTION OF THE EMBODIMENTS

Hereinafter, embodiments for carrying out the present invention will be described with reference to the drawings.

First Embodiment

Figure 1:
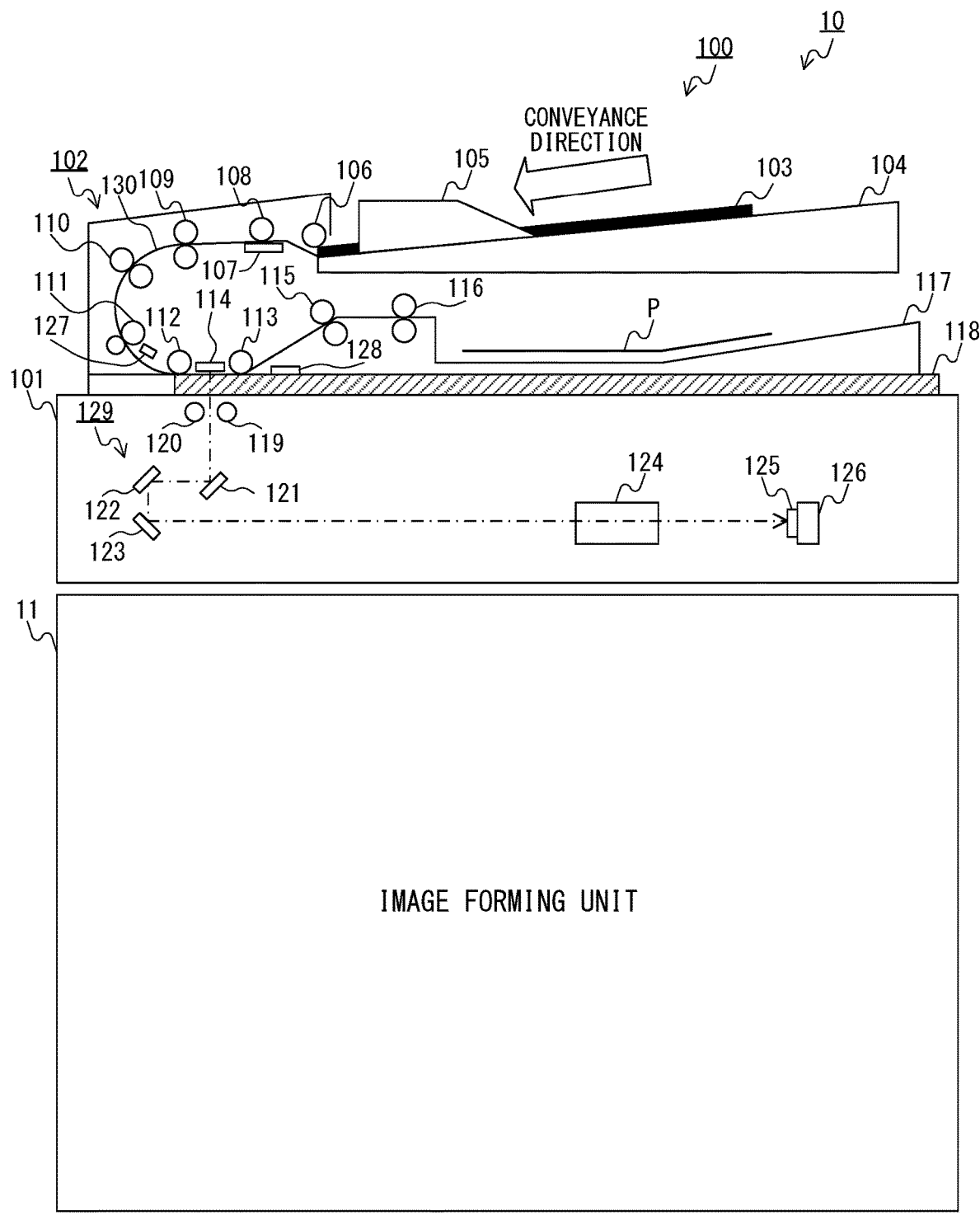
FIG. 1 is a configuration diagram of an image reading apparatus.

FIG. 1 is a configuration explanatory diagram of an image reading apparatus of the present embodiment. The image reading apparatus 100 includes an image reading unit 101 and an ADF 102. The image reading apparatus 100 may form a part of an image forming apparatus 10, such as a copier or a multifunction apparatus, which forms an image on a sheet. The ADF 102 is arranged on an upper part of the image reading unit 101. A platen 118 is provided on an ADF 102 side surface of the image reading unit 101. The ADF 102 is provided to be openable and closable with respect to the platen 118.

The ADF 102 includes an original tray 104 on which an original bundle 103, which consists of one or more original Ps, is placed, a curved conveyance path 130, and a discharge tray 117. The original P is conveyed one by one from the original tray 104 to the conveyance path 130 and is discharged to the discharge tray 117. The original P is read by the image reading unit 101 while it is conveyed along the conveyance path 130. At a base end of the original tray 104, a pickup roller 106 for feeding the original P from the original bundle 103 to the conveyance path 130 is arranged. In the original tray 104, a pair of width regulating plates 105 are arranged at both ends in a direction (width direction) orthogonal to the conveyance direction of the original P. The pair of width regulating plates 105 regulate end portions of the original bundle 103 in the width direction.

A separation roller 108 and a separation pad 107 are provided along the conveyance path 130 on a downstream side of the conveyance direction of the original P with respect to the pickup roller 106. The separation roller 108 and the separation pad 107 are arranged to face each other across the conveyance path 130. The separation roller 108 cooperates with the separation pad 107 to separate the original P fed from the original tray 104, from the top of the original bundle 103, to the conveyance path 130 by the pickup roller 106 one by one.

Along the conveyance path 130 on the downstream side of the conveyance direction of the original P with respect to the separation roller 108, first and second registration rollers 109 and 110, first to fourth conveyance rollers 111, 112, 113, and 115, and a discharge roller 116 are arranged. An original detection sensor 127 is arranged between the first conveyance roller 111 and the second conveyance roller 112. The details of the original detection sensor 127 will be described later. The area between the second conveyance roller 112 and the third conveyance roller is positioned at an upper surface of the platen 118 of the image reading unit 101. This area is a reading position (hereinafter referred to as "ADF reading position") by the image reading unit 101. In the ADF reading position, a white guide member 114 is arranged at a position facing the platen 118 across the conveyance path 130.

The platen 118 of the image reading unit 101 is provided with a shading reference plate 128 at a position adjacent to the ADF reading position via the third conveyance roller 113. A reading unit 129 is provided in a housing of the image reading unit 101. The reading unit 129 includes lamps 119 and 120 as light sources, reflection mirrors 121, 122, and 123, an imaging lens 124, and a color line sensor 125. The reflection mirrors 122 and 123 are arranged to face the reflection mirror 121. The imaging lens 124 and the color line sensor 125 are arranged to face the reflection mirrors 122 and 123. A signal processing board 126 is electrically connected to the color line sensor 125.

In the image reading apparatus 100 having the above configuration, the original bundle 103 placed on the original tray 104 of the ADF 102 is regulated in the width direction by the width regulating plate 105 to thereby prevent the original P from being conveyed diagonally. The pickup roller 106 picks up the original P from the original bundle 103 to feed it to the conveyance path 130. The separation pad 107 and the separation roller 108 cooperate to separate and convey the original P one by one from the top of the original bundle 103.

The first registration roller 109 corrects the skew of the original P, which is separated into one and is conveyed by the separation roller 108. The original P to which the skew correction has been performed is conveyed to the ADF reading position by the second registration roller 110, the first conveyance roller 111, and the second conveyance roller 112. The original P is conveyed between the platen 118 and the white guide member 114 at the ADF reading position. The white guide member 114 presses the original P toward the platen 118 so that the original P passes through the ADF while maintaining contact with the platen 118. Further, the white guide member 114 is read by the reading unit 129 when the original P is not present at the ADF reading position. Based on the reading result of reading the white guide member 114, it is determined whether there is a foreign matter such as dust or the like at the ADF reading position.

The reading unit 129 performs a reading operation for the original P passing through the ADF reading position as follows. Start timing of the reading operation of the original P by the reading unit 129 is controlled according to the detection timing of the original P along the conveyance path 130 by the original detection sensor 127.

The lamps 119 and 120 of the reading unit 129 irradiate the original P passing through the ADF reading position with light. The reflection mirrors 121 to 123 reflect the light reflected by the original P toward the imaging lens 124. The imaging lens 124 forms an image of the reflected light on a light receiving surface of the color line sensor 125. The color line sensor 125 includes a plurality of image pickup elements such as a CCD sensor and a CMOS sensor, and the reflected light forms an image on a light receiving surface of the image pickup element. The color line sensor 125 converts the received reflected light into an electrical signal and transmits it to the signal processing board 126. The direction in which the plurality of image pickup elements are arranged is a main scanning direction. The main scanning direction is orthogonal to the conveyance direction of the original P. The conveyance direction of the original P is a sub-scanning direction.

The signal processing board 126 performs predetermined processing on the electrical signal obtained from the color line sensor 125 and generates image data, which is a reading result of the original P. The image data is a digital signal. When the image reading apparatus 100 is a part of the image forming apparatus 10, the image data is transmitted from the image reading apparatus 100 to the image forming unit 11 in the image forming apparatus 10. In the case of copying processing, the image forming unit 11 forms an image on the sheet based on the image data.

The original P to which reading processing is performed at the ADF reading position is conveyed to the third conveyance roller 113 by the second conveyance roller 112. The original P is conveyed through the third conveyance roller 113, the fourth conveyance roller 115, and the discharge roller 116 in this order, and the original P is discharged to the discharge tray.

The shading reference plate 128 provided on the platen 118 is read by the reading unit 129 at the time of shading correction. Manufacturing variations occur in the color line sensor for each image sensor (for each pixel). Further, it is not easy to make the irradiation light emitted from the lamps 119 and 120 uniform in the main scanning direction. Therefore, even in a case where an image is read from the original P on which an image has been formed with a uniform image density, the digital value of the image data, which is a reading result, varies depending on a position in the main scanning direction.

Shading correction is performed to suppress such variations. Specifically, the reading unit 129 reads the shading reference plate 128. From a reading result of the shading reference plate 128, a correction value is calculated so that the reading result (for example, a luminance value) of the main scanning direction becomes the same specific value. With this correction value, at least one of the irradiation amounts of the lamps 119 and 120, the sensitivity variation of the image pickup element, and the reading result of the image of the original P is corrected, thus, the variation in manufacturing and the variation in the amount of light are corrected.

In order to read the shading reference plate 128, the lamps 119 and 120, and the reflection mirrors 121 and 122 of the reading unit 129 are configured to be movable in the left and right directions (the sub-scanning direction) in the figure. When reading the shading reference plate 128, the lamps 119 and 120 and the reflection mirror 121 move from the ADF reading position to a position directly below the shading reference plate 128. When reading the image of the original P after shading correction, the lamps 119 and 120 and the reflection mirror 121 move to the ADF reading position. The reading unit 129 can also read an image of the original which is manually placed on the platen 118 by the user. In this case, the lamps 119 and 120 of the reading unit 129 and the reflection mirror 121 read the original line by line while moving in the sub-scanning direction.

Figure 2:
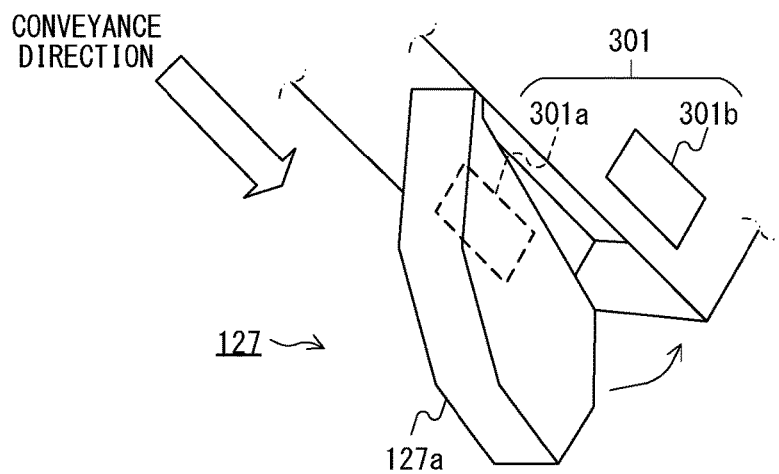
FIG. 2 is an explanatory diagram of an original detection sensor.

FIG. 2 is an exemplary diagram of the original detection sensor 127. The original detection sensor 127 includes an actuator 127a and a transmissive sensor 301. The transmissive sensor 301 includes an irradiation unit 301a and a light receiving unit 301b.

The actuator 127a collapses in the conveyance direction of the original P when the original P is conveyed along the conveyance path 130 to thereby collide against the actuator 127a. The actuator 127a blocks, by collapsing in the conveyance direction of the original P, an optical path between the irradiation unit 301a and the light receiving unit 301b of the transmissive sensor 301. By blocking the optical path between the irradiation unit 301a and the light receiving unit 301b, (for example, the amount of infrared light) the amount of light received by the light receiving unit 301b from the irradiation unit 301a will be changed. The amount of light received by the light receiving unit 301b is converted into an electrical signal. The change in the amount of light received by the light receiving unit 301b corresponds to a change in the level of the electrical signal. From the change of the electrical signal level, it is detected that the original P has reached the detection position of the original detection sensor 127.

<Controller>

Figure 3:
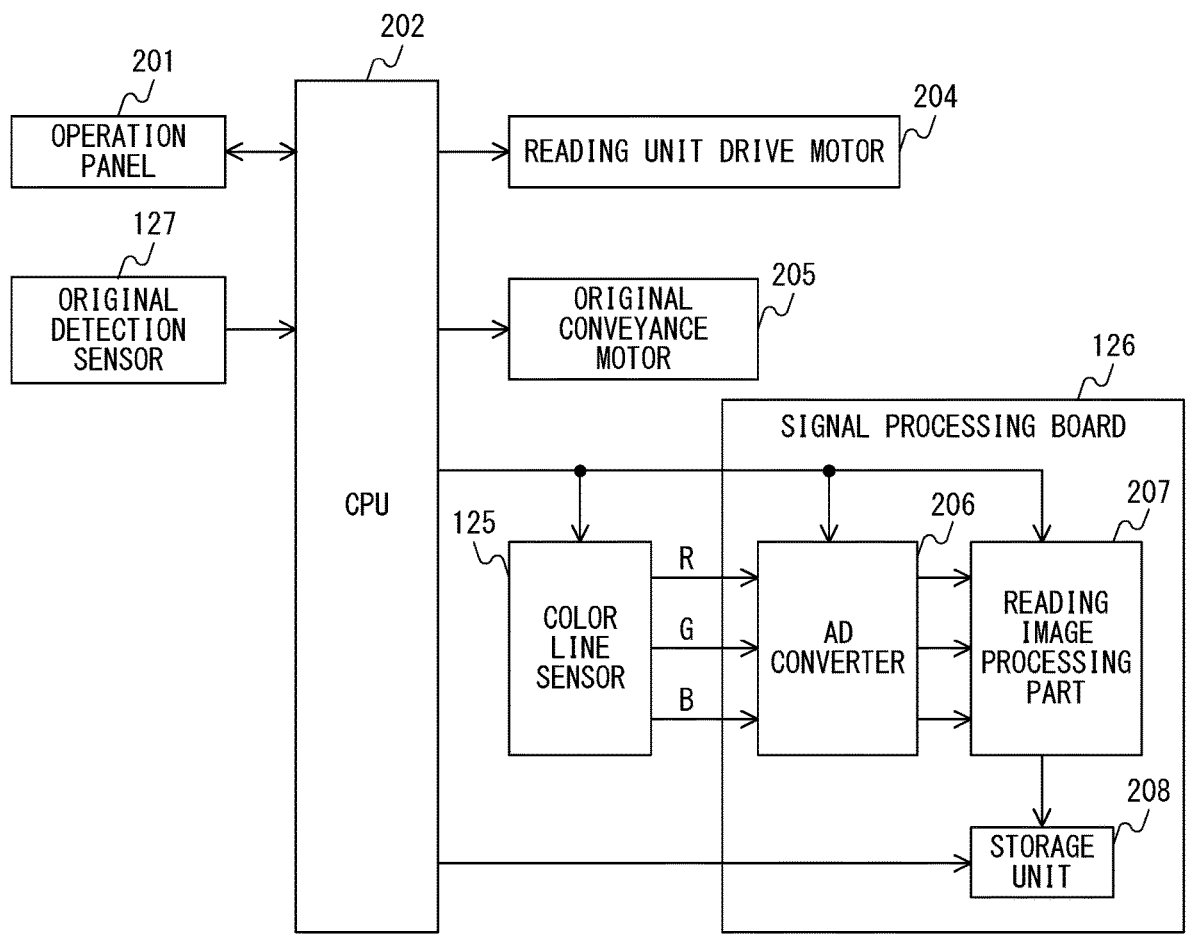
FIG. 3 is an exemplary diagram of a controller.

FIG. 3 is an explanatory diagram of a controller which controls an operation of the image reading apparatus 100. The controller is built in the image reading apparatus 100. In the present embodiment, the controller is comprised of a CPU (Central Processing Unit) 202, however, a semiconductor device such as an MPU or an ASIC may be used. The CPU 202 controls the whole operation of the image reading apparatus 100 by executing a predetermined computer program.

The CPU 202 is in connection with an operation panel 201, the original detection sensor 127, a reading unit drive motor 204, an original conveyance motor 205, the color line sensor 125, an AD converter 206, a reading image processing part 207, and a storage unit 208. The AD converter 206, the reading image processing part 207, and the storage unit 208 are mounted on the signal processing board 126. The CPU 202 determines that the original P has reached the detection position of the original detection sensor 127 based on the change in the level of the electrical signal output from the original detection sensor 127, as described above.

The operation panel 201 is a user interface including an input interface and an output interface. The input interface includes key buttons, a touch panel, and the like. The output interface includes a display, a speaker, and the like. The CPU 202 controls the operation of the image reading apparatus 100 in response to an instruction or the like input from the input interface of the operation panel 201. The CPU 202 outputs information such as the status of the image reading apparatus 100 from the output interface of the operation panel 201. Further, the CPU 202 displays the setting screen on the display when setting the reading conditions and the like to thereby accept the operation contents such as settings by the input interface.

The reading unit drive motor 204 is a drive source for moving the reading unit 129 in the sub-scanning direction under the control of the CPU 202. When reading an image from the original placed on the platen 118 or reading the shading reference plate 128, the CPU 202 moves the reading unit 129 in the sub-scanning direction by the reading unit drive motor 204. The original conveyance motor 205 is a drive source for rotationally driving various rollers arranged along the conveyance path 130. When the ADF 102 is used to read the image of the original P, the CPU 202 controls the original conveyance motor 205 to feed the original P from the original tray 104.

The CPU 202 controls the operation of the color line sensor 125. The color line sensor 125 converts the received reflected light into an electrical signal and outputs it. The color line sensor 125 includes a plurality of the line sensors to receive reflected light of a plurality of colors to read an image in a plurality of colors. In the present embodiment, to receive the reflected light of three colors of R (red), G (green), and B (blue), the color line sensor 125 includes three line sensors each corresponding to the respective color. The electrical signal output from the color line sensor 125 is an analog voltage of each color corresponding to R, G, and B.

The AD converter 206 obtains the analog voltage of each color from the color line sensor 125. The AD converter 206 converts the obtained analog voltage of each color into a digital value. Each digital value converted from the analog voltage of each color by the AD converter 206 is transmitted to the reading image processing part 207. The reading image processing part 207 performs a predetermined process on the digital values of each color to generate image data representing the read image. The reading image processing part 207 stores the image data generated by reading the original P in the storage unit 208. The image data generated by reading the original P may be directly transmitted to the image forming unit 11 or another external device.

<Image Reading Processing Part>

Figure 4:
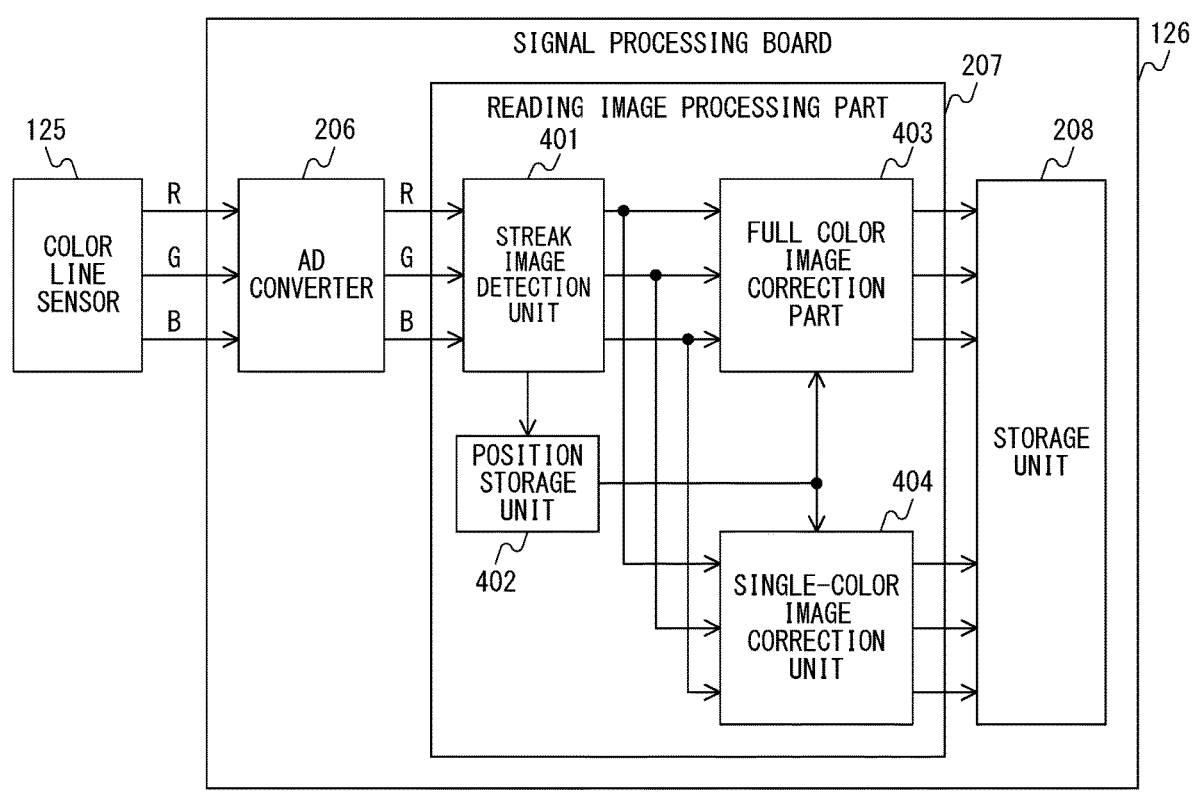
FIG. 4 is a configuration diagram of the reading image processing part.

FIG. 4 is a configuration explanatory diagram of the reading image processing part 207. The reading image processing part 207 includes a streak image detection unit 401, a position storage unit 402, a full color image correction part 403, and a single-color image correction unit 404. In the following, a process, performed by the reading image processing part 207, of erasing the streak image generated by the dust at the ADF reading position on the platen 118 is described. The reading image processing part 207 may have a function of performing another processing on the reading image.

The streak image detection unit 401 obtains a digital value of each color converted from the analog voltage of each color by the AD converter 206. Based on the digital value of each color obtained by reading the white guide member 114 using the color line sensor 125, the streak image detection unit 401 detects a position of the streak image generated by the dust on the platen 118. Here, the position of the streak image corresponds to the position (pixel) in the main scanning direction at the ADF reading position on the platen 118. In the following, the pixel corresponding to the position of the streak image in the main scanning direction is referred to as an "abnormal pixel".

Figure 5A:
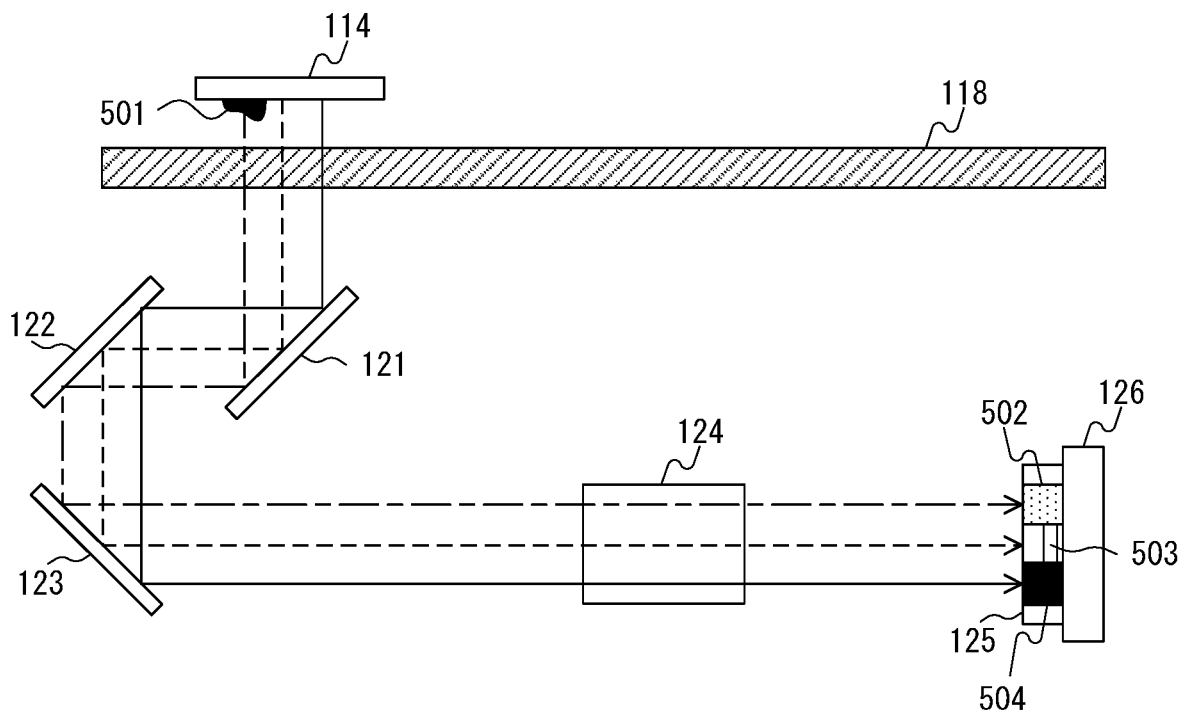
FIG. 5A and FIG. 5B are exemplary diagrams representing the relationship between dust and a color line sensor.
Figure 5B:
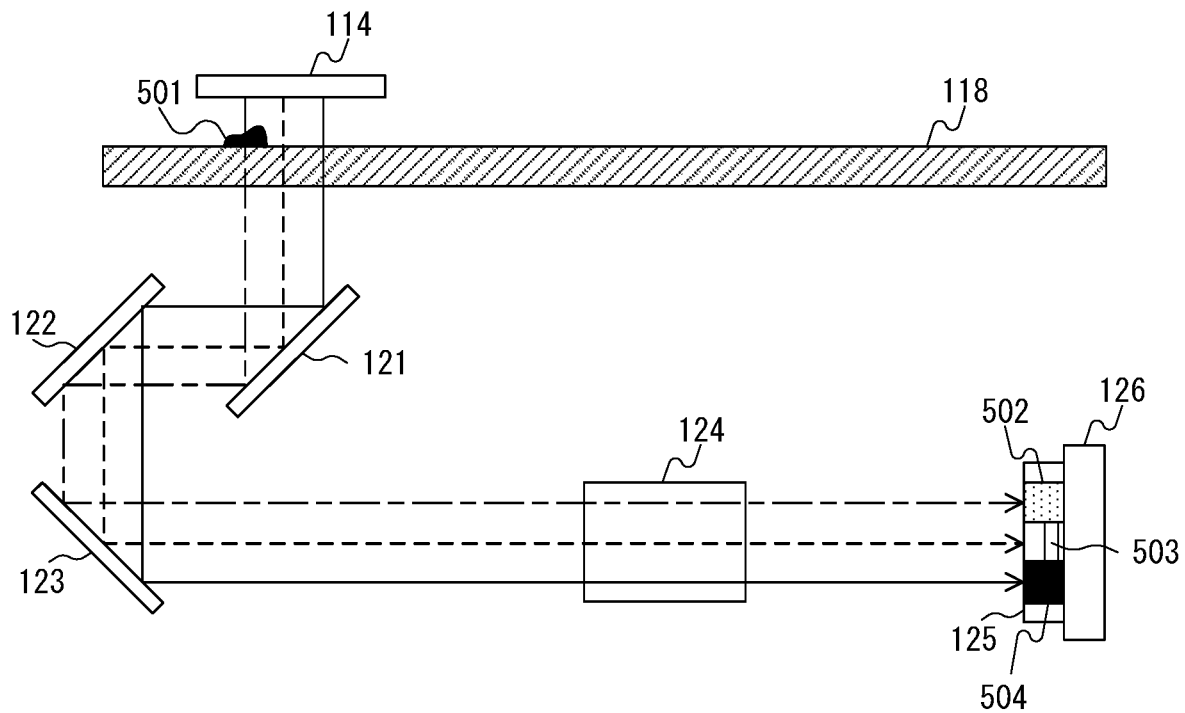

FIG. 5A and FIG. 5B are explanatory diagrams for representing the relationship between the dust (foreign matter) on the ADF reading position and the color line sensor 125. The color line sensor 125 of the present embodiment includes three line sensors (R sensor 502, G sensor 503, and B sensor 504) provided for each color to receive the reflected light for each of the three colors. The R sensor 502 includes a filter that transmits a red component of the reflected light to receive the red light. The G sensor 503 includes a filter that transmits a green component of the reflected light to receive the green light. The B sensor 502 includes a filter that transmits a blue component of the reflected light to receive the blue light. The R sensor 502, the G sensor 503, and the B sensor 504 are the line sensors in which a plurality of the image pickup elements are arranged in the main scanning direction, respectively.

The reflected light reflected by the white guide member 114 or the original P forms an image on a light receiving surface of the line sensor (R sensor 502, G sensor 503, and B sensor 504) of each color by the imaging lens 124 through the reflection mirrors 121, 122, and 123. In FIG. 5A and FIG. 5B, a dust 501 is attached to a position corresponding to the R sensor 502 in the ADF reading position and is not attached to a position corresponding to the G sensor 503 or the B sensor 504 in the ADF reading position. In FIG. 5A, the dust 501 is on the ADF reading position of the white guide member 114. In FIG. 5B, the dust 501 is on the ADF reading position of the platen 118. The optical path of the reflected light received by the R sensor 502 is shown by a dot-dash line, the optical path of the reflected light received by the G sensor 503 is shown by a broken line, and the optical path of the reflected light received by the B sensor 504 is shown by a solid line.

The method of detecting a position of the abnormal pixel will be described below. First, the output of the color line sensor 125 when the color line sensor 125 reads the white guide member 114 will be described.

Figure 6:
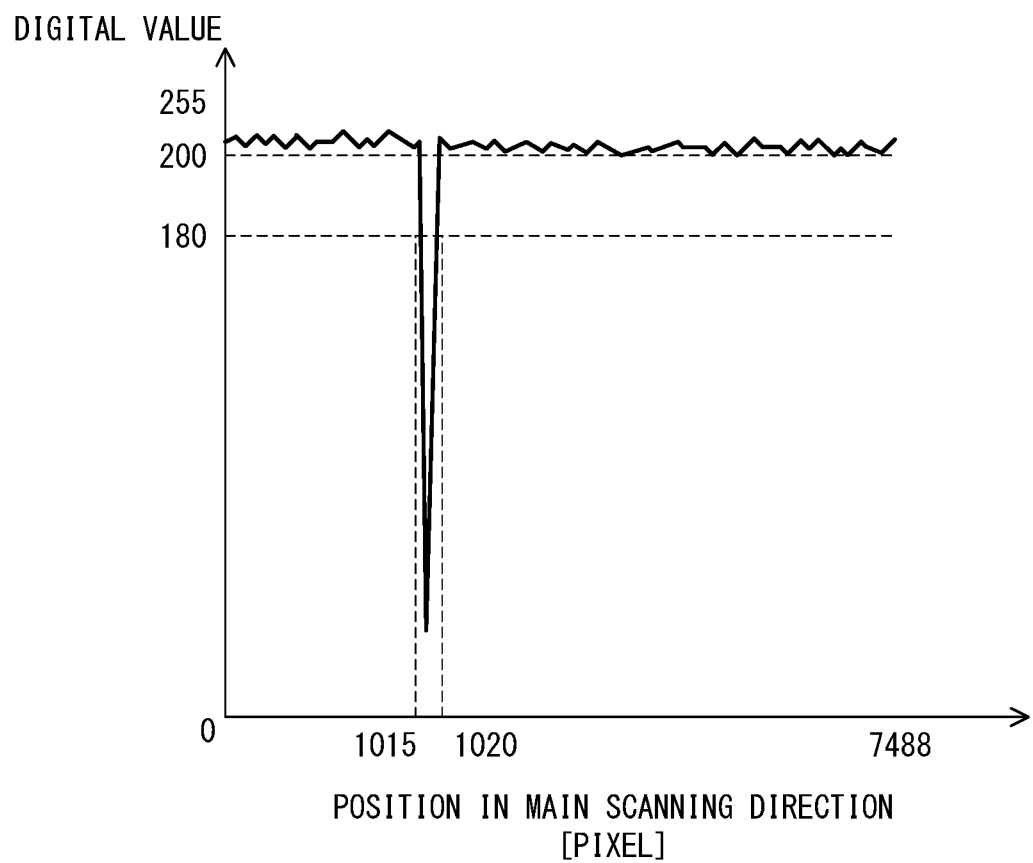
FIG. 6 is an exemplary diagram of a digital value of each position in the main operation direction when there is dust.

FIG. 6 is an example diagram of digital values at each position in the main operation direction based on the reading result output from the color line sensor 125 when the dust 501 is on the ADF reading position. In FIG. 6, a horizontal axis indicates each position in the main scanning direction, and a vertical axis indicates a digital value. When the AD converter 206 outputs an 8-bit digital value, the digital value when the analog voltage output from the color line sensor 125 is AD-converted is in a range of 0 to 255.

When the white guide member 114 is read after shading correction, the digital values are almost the same in the main scanning direction. However, for example, as shown in FIG. 5A, when the dust 501 is on the white guide member 114 at the ADF reading position, the light emitted to the white guide member 114 is blocked by the dust 501 at the position where the dust 501 is located. Therefore, the digital values at this position are smaller than the digital values at other positions. The streak image detection unit 401 compares the digital value for each position in the main scanning direction with a predetermined threshold value when the white guide member 114 is read. As a result of the comparison, the streak image detection unit 401 determines a pixel corresponding to a position where the digital value is smaller than a predetermined threshold value as a candidate for an abnormal pixel (abnormal pixel candidate).

Further, as shown in FIG. 5B, when the dust 501 is on the platen 118 at the ADF reading position, the light emitted to the white guide member 114 is blocked by the dust 501 at the position where the dust 501 is located. Therefore, the digital value at this position is smaller than the other positions. The streak image detection unit 401 compares the digital value for each position in the main scanning direction with a predetermined threshold value when the white guide member 114 is read. As a result of the comparison, the streak image detection unit 401 determines a pixel corresponding to a position where the digital value is smaller than a predetermined threshold value as a candidate for an abnormal pixel (abnormal pixel candidate).

In the example of FIG. 6, the digital value when the white guide member 114 is read is about 200. Therefore, for example, when the threshold value is set to "180", a pixel having a digital value lower than "180" can be determined as an abnormal pixel candidate. In the example of FIG. 6, the pixels at the positions 1015 to 1020 in the main scanning direction are determined to be abnormal pixel candidates.

Next, the output of the color line sensor 125 when the color line sensor 125 reads the image of the original P passing through the ADF reading position will be described.

As shown in FIG. 5A, when the dust 501 is on the white guide member 114 in the ADF reading position and the original P passes over the platen 118, the dust 501 is hidden by the original P when viewed from the color line sensor 125. As a result, a streak image caused by the dust 501 does not appear in the image showing the reading result of the original P. That is, the values at the positions 1015 to 1020 in the main scanning direction in FIG. 6 do not become smaller than the predetermined threshold value due to the dust 501.

As shown in FIG. 5B, when the dust 501 is on the platen 118 in the ADF reading position and the original P passes over the platen 118, the original P is not hidden by the dust 501 when viewed from the color line sensor 125. As a result, the streak image due to the dust 501 appears in the image showing the reading result of the original. That is, the values at the positions 1015 to 1020 in the main scanning direction in FIG. 6 become smaller than the predetermined threshold value due to the dust 501. The streak image detection unit 401 determines the pixel corresponding to the position where the digital value is smaller than the predetermined threshold value as the candidate for the abnormal pixel (abnormal pixel candidate).

The streak image detection unit 401 determines the abnormal pixel based on the image data obtained during a period from the start of reading until the image of a predetermined length is read from the tip of the original P. If the abnormal pixel candidates continuously appear in the sub-scanning direction at the same position in the main scanning direction in the streak image of the period, the streak image detection unit 401 determines, among the abnormal pixel candidate, the pixel at the position in the main scanning direction as the abnormal pixel. That is, if the streak image appears continuously before and after the original P reaches the ADF reading position, the streak image detection unit 401 determines, in the streak image, the pixel at the position in the main scanning direction as the abnormal pixel. The streak image detection unit 401 generates information for each color (red streak image information, green streak image information, and blue streak image information) which indicates the position of the abnormal pixel. Then, the streak image detection unit 401 stores the same in the position storage unit 402.

The streak image information (position information) stored in the position storage unit 402 is read by the full color image correction part 403 and the single-color image correction unit 404. The full color image correction part 403 and the single-color image correction unit 404 perform linear interpolation of digital values corresponding to the position (target pixel) of the streak image, based on the position information obtained from the position storage unit 402, to correct (remove) the streak image caused by the foreign matter. The reading image processing part 207 stores the corrected image data in the storage unit 208. The method of detecting abnormal pixels is not limited to the above method, and other methods known in the art may be used.

Figure 7:
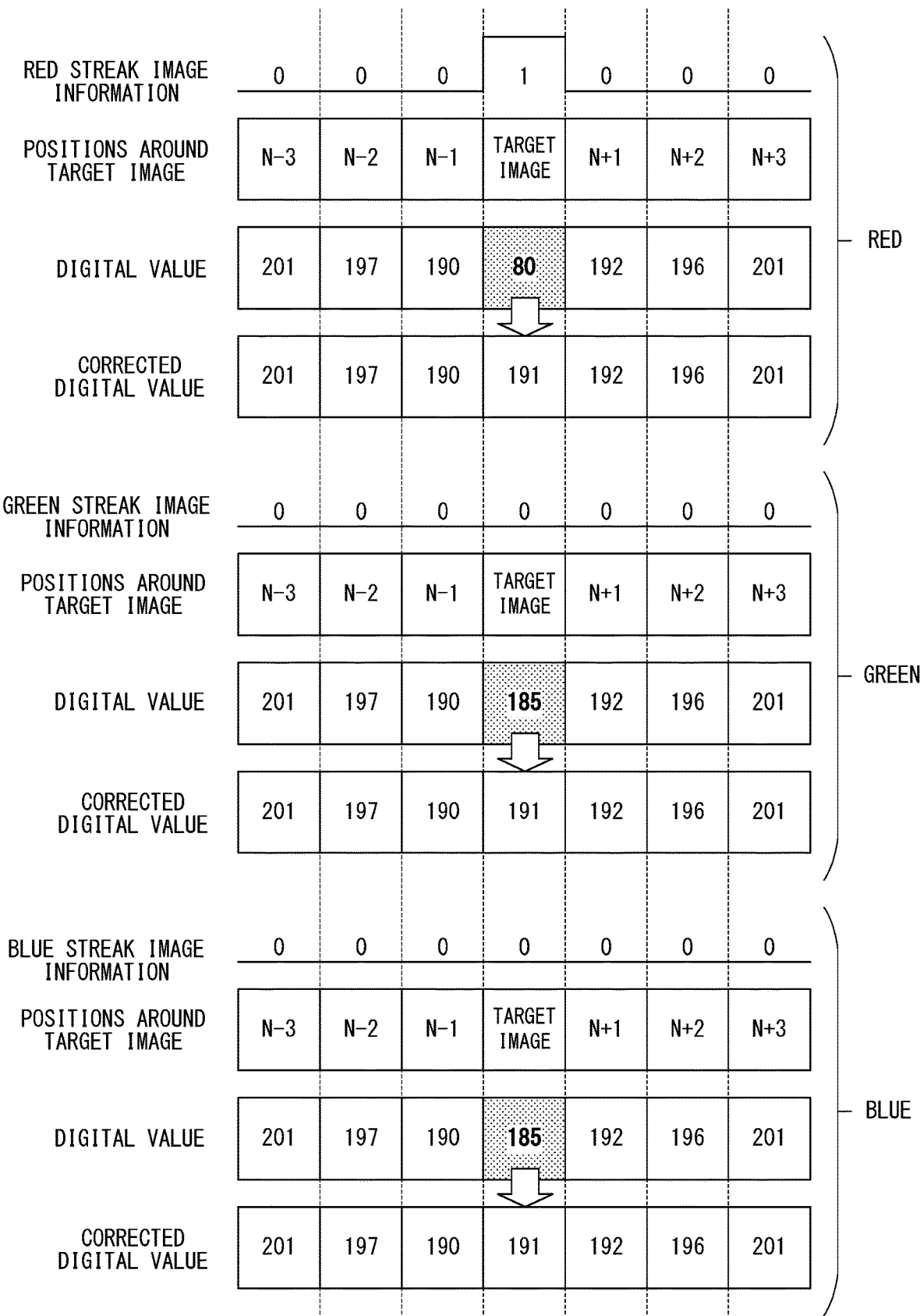
FIG. 7 is an explanatory diagram representing image processing performed by the full color image correction part.

FIG. 7 is an explanatory diagram of image processing of the full color image correction part 403. The position storage unit 402 stores full color streak image information (red streak image information, green streak image information, blue streak image information). In the full color streak image information, as to each of the R sensor 502, G sensor 503, and B sensor 504, "1" is set for the position in the main scanning direction (position of an abnormal pixel) at which it is determined that the streak image has occurred. Further, "0" is set for the position in the main scanning direction at which it is determined that the streak image has not occurred. Due to the full color streak image information, it is possible to know which position in the main scanning direction the streak image occurs. The streak image correction is performed based on the full color streak image information.

The red streak image information in FIG. 7 indicates that the value of the target pixel (target position) is "1" and that the streak image has occurred in the pixel of interest. As to the positions N−3, N−2, N−1, N+1, N+2, and N+3 around the main scanning direction of the target pixel, the red streak image information value is "0". This indicates that the streak image has not occurred. The digital value, for red color, of the target pixel is "80", which is smaller than the digital values of the surrounding positions.

The full color image correction part 403 first identifies the position of the streak image (abnormal pixel) based on the red streak image information obtained from the position storage unit 402. Next, the full color image correction part 403 refers to the digital value of the position adjacent to the specified position of the streak image in the main scanning direction to interpolate the digital value of the position of the streak image linearly. By performing the linear interpolation, the streak image is removed.

In the example of the R sensor 502, the digital values of the position N−1 and the position N+1 adjacent to the target pixel, in which the streak image is generated, are "190" and "192", respectively. Assuming that the digital value of the target pixel is D [N], the digital value of the adjacent positions are D [N−1] and D [N+1], and the corrected (after linear interpolation) digital value of the target pixel is D [N]', the digital value D [N]' is expressed by the following equation (1).

$$D[N]'=D[N-1]+(D[N+1]-D[N-1])/2$$

$$D[N]'=190+(192-190)/2=191 \quad (1)$$

Therefore, the digital value D [N]' of the target pixel after linear interpolation is "191". By converting the digital value "80" of the target pixel before correction to "191" as described above, the streak image correction is completed.

The full color image correction part 403 performs the streak image correction processing at the position (pixel) in the main scanning direction at which the streak image has occurred as described above. Even in a case where the abnormal pixel (the streak image) is detected only at the ADF reading position of the R sensor 502, the full color image correction part 403 performs the same streak image correction processing on the digital value of the same position (pixel) in the main scanning direction obtained from the reading results of the G sensor 503 and the B sensor 504. As a result, the digital value "185" of the target pixel in the green streak image information is corrected to "191". The digital value "185" of the target pixel in the blue streak image information is corrected to "191".

The single-color image correction unit 404 selects a color for the streak image correction based on the full color streak image information obtained from the position storage unit 402. When the streak image occurs only in the ADF reading position of the R sensor 502 as shown in FIG. 7, the digital value of the red color becomes a smaller value. Therefore, the streak image of the green component and the blue component is formed in the read image. The single-color image correction unit 404 corrects only the color in which this streak image is detected. Similar to the full color image correction part 403, the correction is performed by linear interpolation.

Figure 8:
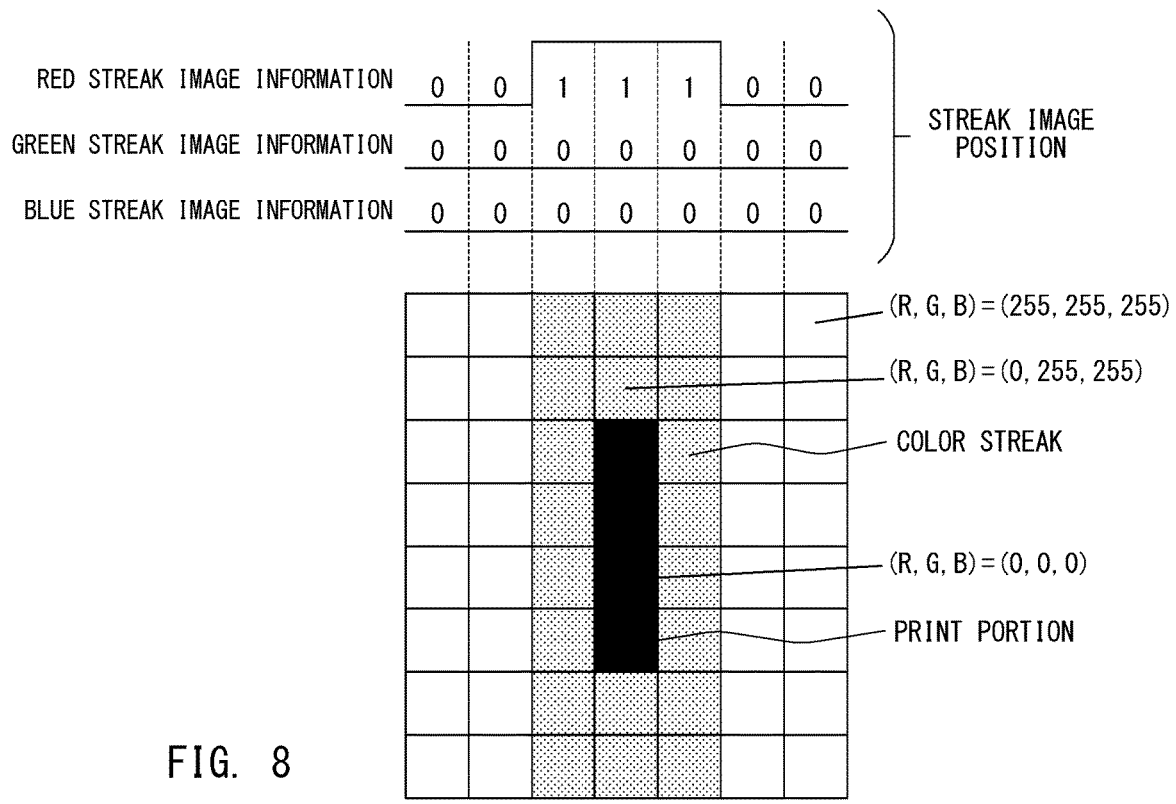
FIG. 8 is an explanatory diagram for explaining differences after performing a full color streak image correction and performing a single-color streak image correction.
Figure 9:
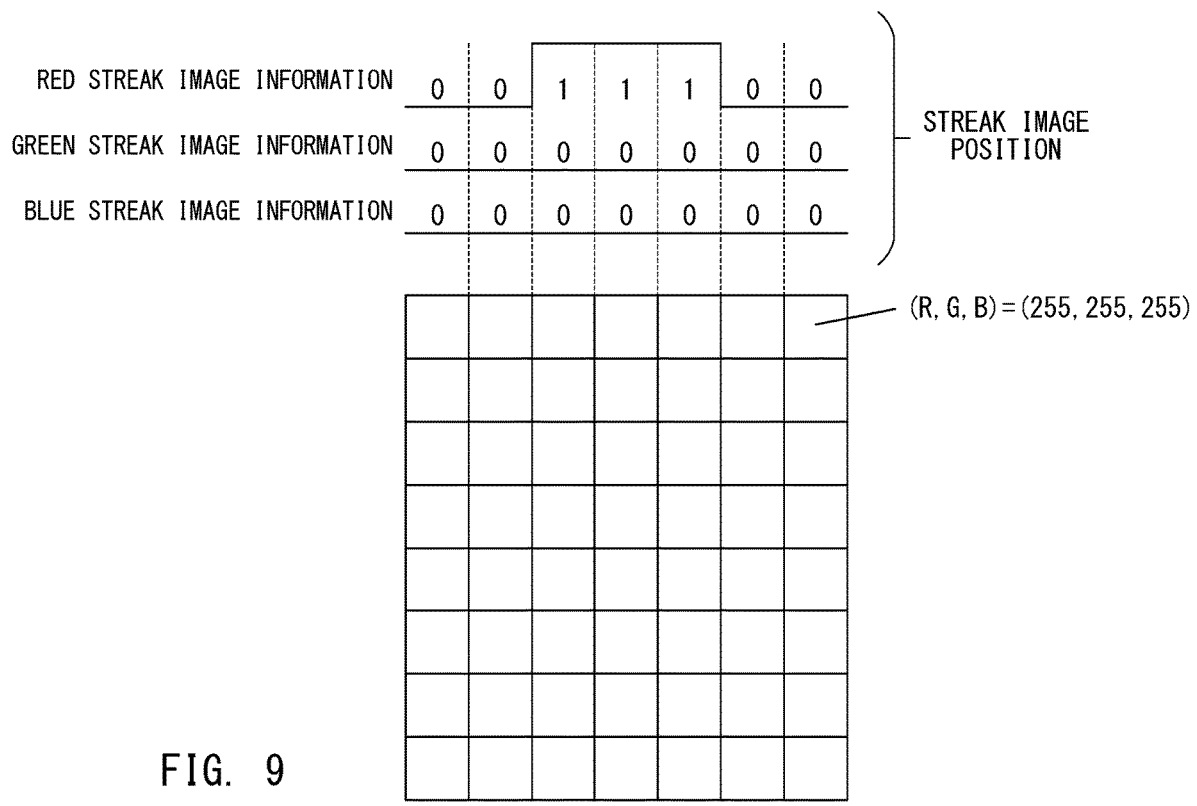
FIG. 9 is an explanatory diagram for explaining differences after performing the full color streak image correction and performing the single-color streak image correction.
Figure 10:
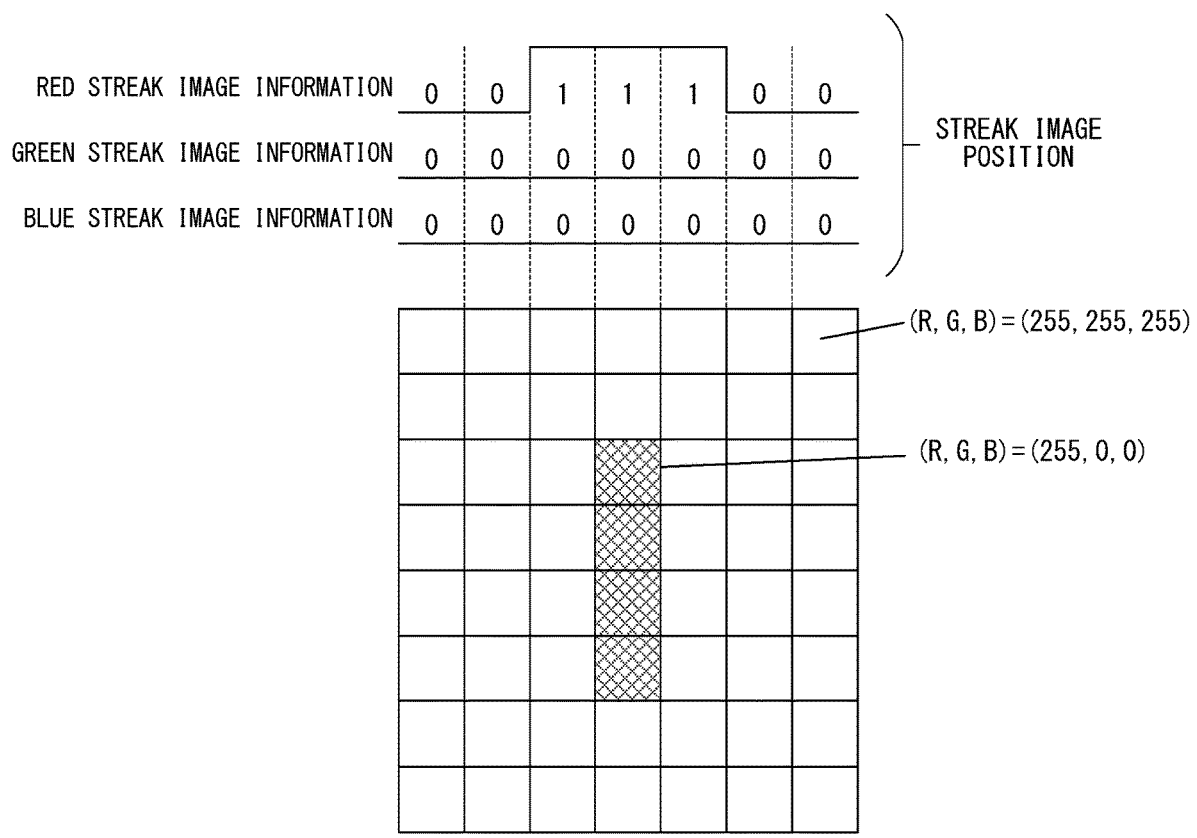
FIG. 10 is an explanatory diagram for explaining differences after performing the full color streak image correction and performing the single-color streak image correction.

The difference after the correction between the streak image correction of full color and a single-color will be described with reference to FIG. 8 to FIG. 10. FIG. 8 shows a state before correction, FIG. 9 shows a state after correction by the full color image correction part 403, and FIG. 10 shows a state after correction by the single-color image correction unit 404.

FIG. 8 illustrates an example of the reading image when the dust is on the ADF reading position of the R sensor 502. The digital value of the printed portion is black (R, G, B)=(0, 0, 0). Since the digital value of the red color becomes smaller due to the dust, the streak image (color streak) (R, G, B)=(0, 255, 255) has occurred.

The full color image correction part 403 performs the streak image correction for each color component of full color (R, G, B). When the full color image correction part 403 performs the streak image correction based on the equation (1) for the full color streak image information as shown in FIG. 8, the result shown in FIG. 9 is obtained. That is, the streak image (color streak) of (R, G, B)=(0, 255, 255) and the printed portion of (R, G, B)=(0, 0, 0) are corrected, and the digital value of each position becomes (R, G, B)=(255, 255, 255). In this way, the printed portion may be erased by performing the streak image correction of the full color.

The single-color image correction unit 404 corrects only the streak image of red for which the streak image is detected. In a case where the single-color image correction unit 404 corrects the streak image based on the equation (1) for the red streak image information, as shown in FIG. 8, a result shown in FIG. 10 is obtained. That is, the streak image (color the "streak") of (R, G, B)=(0, 255, 255) is removed, however, the printed portion becomes (R, G, B)=(255, 0, 0). In this way, by performing the single-color streak image correction, the color of the printed portion changes and the printed portion becomes chromatic color, however, the printed portion is not erased. In this regard, for example, when the green streak image is detected at the red streak image position, the streak image correction is also performed for the green.

Figure 11A:
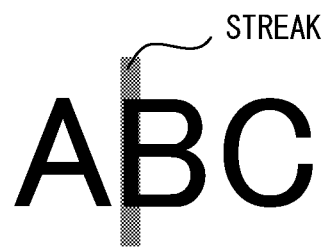
FIG. 11A, FIG. 11B, and FIG. 11C are explanatory diagrams for explaining the differences between the full color streak image correction and the single-color streak image correction.
Figure 11B:
Figure 11C:

FIG. 11A to FIG. 11C are specific explanatory diagrams of the difference between the "streak" image correction of all colors and the "streak" image correction of a single-color. FIG. 11A is an explanatory diagram for explaining an influence of the streak image, which is caused by the dust on the ADF reading position of the R sensor 502, on a part of the character "B" of the character string "ABC". In a case where such a reading image is corrected by the full color image correction part 403, the character string "ABC" may be erroneously recognized as a character string "A3C", as shown in FIG. 11B. When it is corrected by the single-color image correction unit 404, as shown in FIG. 11C, the color of the character changes and becomes chromatic color, however, the character string "ABC" can be recognized in this case. In this way, in order not to lose the character information, it is desirable to perform the single-color streak image correction.

On the other hand, the full color streak image correction is effective in the following cases. The image reading apparatus 100 is usually equipped with an ACS (Auto Color Selection) function for determining whether the image printed on the read original P is achromatic or chromatic. The ACS function is a function to determine that a color image is printed on the original P in a case where the scanned image printed on the original P is chromatic and determine that a monochrome image is printed on the original P in a case where the scanned image printed on the original P is achromatic. By providing the ACS function, it is automatically identified whether the original image is chromatic or achromatic. It is not necessary for the user to specify the operation mode of image reading as a color mode or monochrome mode.

As described above, the single-color streak image correction is performed only for a sensor of a specific color, for example, for the R sensor 502, thus the color of the reading image changes from achromatic color to chromatic color. Therefore, the image reading apparatus 100 which includes the ACS function may determine the original on which a monochrome image is printed as the original on which a color image is printed. In the case of image reading for copy output with a charge, a color copy is generally set at a higher charge as compared to a monochrome copy. Therefore, it may be disadvantageous to the user that the monochrome image is determined as a color image by single-color streak image correction. In this way, in the case of image reading for copy output, the full color streak image correction is desirable, and in the case of image reading for digitizing forms, etc., in order to avoid loss of character information, the single-color streak image correction is desirable.

Figure 12:
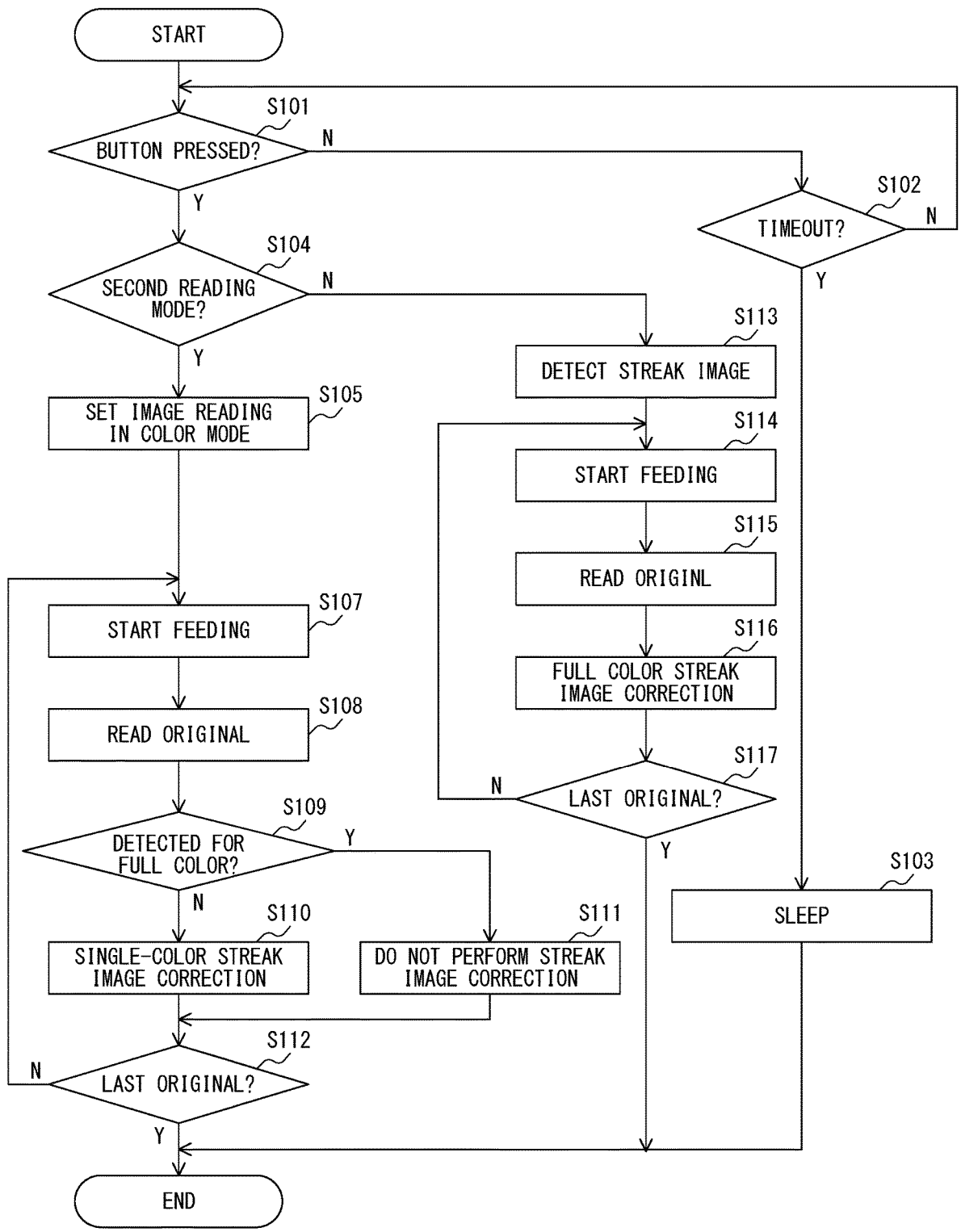
FIG. 12 is a flowchart representing an image reading process with the streak image correction.

FIG. 12 is a flowchart representing the image reading processing including the streak image correction by the image reading apparatus 100 having the above configuration. The image reading apparatus 100 can operate in two reading modes, e.g., a first reading mode and a second reading mode. The first reading mode is a reading mode in which the streak image correction of full color is performed by suppressing a change in color, for example, when reading an image for copy output. The second reading mode is a reading mode in which the single-color streak image correction is performed while avoiding the loss of character information, as in the case of reading an image such as a form.

The CPU 202 determines whether the user pressed the image reading start button provided on the operation panel 201 (STEP S101). The CPU 202 makes the above determination based on whether a signal transmitted from the operation panel 201 is obtained when the image reading start button is pressed. When the image reading start button is not pressed (STEP S101: N), the CPU 202 determines whether the predetermined time has elapsed without pressing the image reading start button and the timeout has occurred (STEP S102). If the timeout has not occurred (STEP S102: N), the CPU 202 returns to the processing of STEP S101 and determines whether the image reading start button has been pressed again. When the time-out has occurred (STEP S102: Y), the CPU 202 controls the image reading apparatus 100 to enter a sleep state in which the power consumption is lower than usual, and ends the processing (STEP S103).

In a case where the image reading start button is pressed (STEP S101: Y), the CPU 202 determines whether the second reading mode is selected (STEP S104). The reading mode is set through the operation panel 201, for example, before the image reading start button is pressed. For example, the user sets the first reading mode at the time of copying and sets the second reading mode at the time of digitizing a form.

In a case where the second reading mode is selected (STEP S104: Y), the CPU 202 sets the image reading apparatus 100 (color line sensor 125) to perform the image reading in color mode (STEP S105). Then, the CPU 202 drives the original conveyance motor 205 to start feeding the original (STEP S107). The CPU 202 turns on the lamps 119 and 120 when the original detection sensor 127 detects the original during conveying the same and starts the reading operation using the color line sensor 125 (STEP S108). The reading operation is started before the original reaches the ADF reading position. That is, the color line sensor 125 reads the white guide member 114 before the original reaches the ADF reading position, then, the color line sensor 125 reads the image of the original when the original reaches the ADF reading position. As a result, the abnormal pixel is detected as described above.

When the original image is read, the CPU 202 determines whether the streak image is detected for all colors based on the full color streak image information stored in the position storage unit 402 (STEP S109). In a case where the streak image is not detected for all colors (STEP S109: N), the CPU 202 uses the single-color image correction unit 404 to perform the single-color streak image correction only for the color for which the streak image is detected (STEP S110). As a result, even in a case where the character and the streak image overlap, though the color of the character may change from the achromatic color to the chromatic color, the risk of losing the character information is suppressed.

In a case where the streak image is detected for all colors (STEP S109: Y), the CPU 202 does not perform the streak image correction by the full color image correction part 403 and the single-color image correction unit 404 (STEP S111). If the streak image is detected for all colors, performing a single-color streak image correction only for the color for which the streak image is the same as performing the streak image correction for all colors, as a result. In this case, there is a risk of losing the character information. In the second reading mode for reading the image of the form such as an invoice, priority is given to suppressing the risk of loss of character information. Therefore, when the streak image is detected for all colors, for each of the full color image correction part 403 or the single-color image correction unit 404, it is preferable to not perform the streak image correction.

After that, the CPU 202 determines whether the original from which the image is read is the last original (STEP S112). For example, a sensor for detecting presence or absence of the original on the original tray 104 is provided in the original tray, and the determination of the last original is performed based on the detection result of this sensor. If the read original is not the last one (STEP S112: N), the CPU 202 returns to the processing of STEP S107 and feeds the next original to read the image. When the original is the last original (STEP S112: Y), the CPU 202 ends the process.

When the second reading mode is not selected as the reading mode (STEP S104: N), the CPU 202 operates in the first reading mode. In the first reading mode, the color reading and the monochrome reading are set by the user setting or the ACS function. The CPU 202 reads an image from the fed original (STEP S113 to STEP S115) in the same manner as in the processing of STEP S107 to STEP S108.

The CPU 202 performs the streak image correction for all colors by the full color image correction part 403 after reading the image of the original (STEP S116). In the first reading mode, the streak image correction for all colors is always performed to prevent the achromatic original image from changing to the chromatic color reading image. After that, the CPU 202 determines whether the original from which the image is read is the last original (STEP S117). In a case where the read original is not the last original (STEP S117: N), the CPU 202 returns to the processing of STEP S114 and feeds the next original to read the image. In a case where the original is the last original (STEP S117: Y), the CPU 202 ends the process.

When reading an image from the original, such as a form (an invoice, etc.), the image reading apparatus 100 described above can appropriately correct the streak image in the image while reducing the risk of loss of the character information. Therefore, it is possible to easily identify characters from the read image. In this way, the streak image is appropriately corrected.

Second Embodiment

Figure 13:
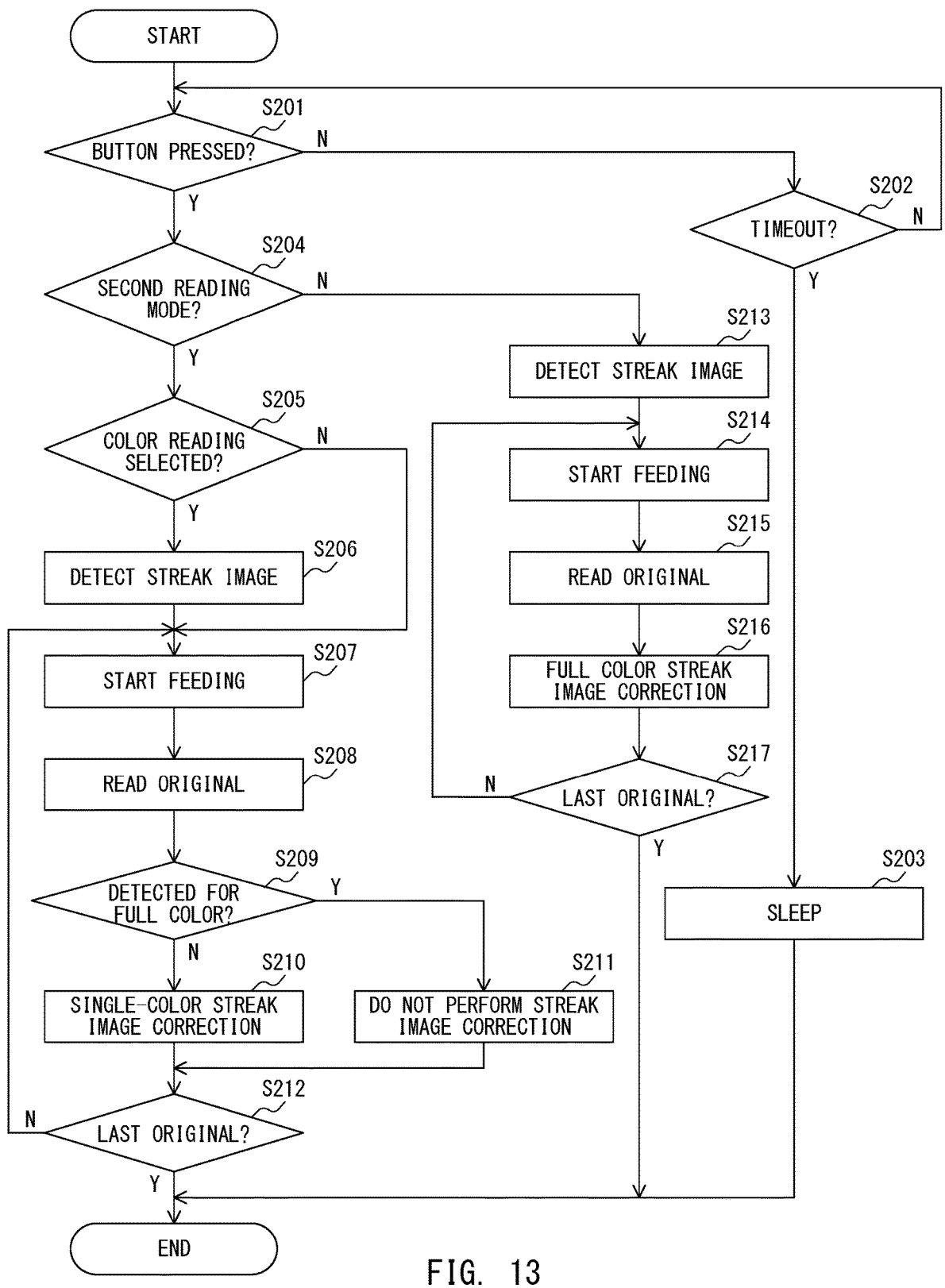
FIG. 13 is a flowchart representing the image reading process with the streak image correction.

Since the configuration of the controller and the configuration of the image reading apparatus 100 of the second embodiment are the same as those in the first embodiment, the description thereof will be omitted. FIG. 13 is a flowchart representing an image reading processing including the streak image correction by the image reading apparatus 100 of the second embodiment.

Since the processing of STEP S201 to STEP S204 is the same as the processing of STEP S101 to STEP S104 of FIG. 12, the description thereof will be omitted. Since the processing performed in a case where the reading mode is not the second reading mode is the same as the processing of STEP S113 to STEP S117 in FIG. 12, the description thereof will be omitted (STEP S204: N, STEPs S213 to S217). In a case where the reading mode is the second reading mode (STEP S204: Y), the CPU 202 determines whether the reading of the color image is instructed by the user (STEP S205). When the reading of the color image is instructed (STEP S205: Y), the CPU 202 determines to detect the streak image and start feeding the original (STEPs S206, S207). Since the subsequent processing is the same as the processing of STEP S108 to STEP S112 in FIG. 12, the description thereof will be omitted (STEPs S208 to S212).

When the reading of the color image is not instructed (STEP S205: N), the CPU 202 determines to not detect the streak image and starts feeding the original (STEP S206). In this case, the monochrome image is read. Since the subsequent processing is the same as the processing of STEP S108 to STEP S112 in FIG. 12, the description thereof will be omitted (STEPs S208 to S212).

When reading a monochrome image, the image is read with a single-color. Therefore, there is no difference between the single-color streak image correction and the full color streak image correction, thus, there is the risk of loss of the character information. In order to suppress this risk, in a case where the second reading mode and the monochrome image are selected, the streak image correction by the full color image correction part 403 and the single-color image correction unit 404 is not performed.

In the image reading apparatus 100 described above, when reading an image from the original such as the form, for example, the invoice, reading of the color image, and reading of the monochrome image are selected according to the user's instruction, and the risk of loss of the character information can be suppressed. Therefore, it is possible to easily identify characters from the read image. In this way, the streak image is appropriately corrected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese patent application No. 2021-026679, filed Feb. 22, 2021, which is hereby incorporated by reference herein in its entirety.

What is claimed is:

1. An image reading apparatus comprising:
   an original tray on which an original is to be stacked;
   a conveyance unit configured to convey the original stacked on the original tray;
   a reading unit including a reading sensor having a light receiving element to receive light of a first color and a light receiving element to receive light of a second color that is different from the first color, wherein the reading unit is configured to read an image of the original conveyed by the conveyance unit by using the reading sensor to generate image data which represents a reading result of the reading unit;
   at least one processor configured to:
      determine a first abnormal position which is a position in a first direction of an abnormal pixel of the first color in the image represented by the image data, wherein, in the image represented by the image data, the first direction is a direction which intersects a second direction corresponding to a conveyance direction in which the original is conveyed;

determine a second abnormal position which is a position in the first direction of an abnormal pixel of the second color in the image represented by the image data;

perform a correction processing for removing a streak image by correcting the image data;

wherein the at least one processor is configured to:

operate in a first reading mode in which the correction processing to the image data of the first color corresponding to the first abnormal position in the image represented by the image data and the correction processing is performed, regardless of presence or absence of the abnormal pixel of the second color, to the image data of the second color corresponding to the first abnormal position in the image represented by the image data; and operate in a second reading mode in which the correction processing is performed to the image data of the first color corresponding to the first abnormal position in the image represented by the image data and the correction processing is not performed to the image data of the second color corresponding to the first abnormal position in the image represented by the image data in a case where the abnormal pixel of the second color is not in the first abnormal position.

2. The image reading apparatus according to claim 1, further comprising an operation unit configured to select one of the first reading mode and the second reading mode.

3. The image reading apparatus according to claim 1, wherein the at least one processor is configured to perform, in the second reading mode, in a case where the abnormal pixel of the second color is in the first abnormal position, the correction processing to the image data corresponding to the abnormal pixel of the second color positioned at the first abnormal position in the image represented by the image data.

4. The image reading apparatus according to claim 1, wherein the reading sensor includes a light receiving element configured to receive light of a third color which is different from both the first color and the second color;

wherein the at least one processor is configured to determine a third abnormal position which is a position of an abnormal pixel of the third color in the first direction in the image represented by the image data, wherein the at least one processor is configured to:

perform, in the first reading mode, the correction processing to the image data of the first color corresponding to the first abnormal position in the image represented by the image data, and perform the correction processing, regardless of presence or absence of the abnormal pixel of the second color, to the image data of the second color corresponding to the first abnormal position in the image represented by the image data; and perform the correction processing, regardless of presence or absence of the abnormal pixel of the third color, to the image data of the third color corresponding to the first abnormal position in the image represented by the image data, and wherein, in the second reading mode, in a case where the abnormal pixel of the second color and the abnormal pixel of the third color are in the first abnormal position, the at least one processor is configured to not perform the correction processing to:

the image data corresponding to the abnormal pixel of the first color positioned at the first abnormal position;

the image data corresponding to the abnormal pixel of the second color positioned at the first abnormal position; and the image data corresponding to the abnormal pixel of the first color positioned at the first abnormal position.

5. The image reading apparatus according to claim 1, wherein the at least one processor is configured to not perform the correction processing in a case where reading of a monochrome image is instructed in the second reading mode.

6. The image reading apparatus according to claim 1, wherein the reading unit is configured to read the image of the original passing through a reading position on a transparent member through the transparent member, wherein the image reading apparatus includes a white member arranged at a side opposite to the reading unit with respect to the transparent member at the reading position, and wherein the at least one processor is configured to determine the first abnormal position and the second abnormal position based on a result of reading the white member by the reading unit and a result of reading the image of the original.

7. The image reading apparatus according to claim 1, wherein the correction processing is processing of correcting the image data to be corrected by using the image data corresponding to a pixel adjacent to a pixel corresponding to the image data to be corrected in the first direction.

8. The image reading apparatus according to claim 1, wherein the second reading mode is a mode for reading a form as the original.

9. An image forming apparatus comprising an image reading apparatus, wherein the image reading apparatus comprising:

an original tray on which an original is to be stacked;

a conveyance unit configured to convey the original stacked on the original tray;

a reading unit including a reading sensor having a light receiving element to receive light of a first color and a light receiving element to receive light of a second color that is different from the first color, wherein the reading unit is configured to read an image of the original conveyed by the conveyance unit by using the reading sensor to generate image data which represents a reading result of the reading unit;

at least one processor configured to:

determine a first abnormal position which is a position in a first direction of an abnormal pixel of the first color in the image represented by the image data, wherein, in the image represented by the image data, the first direction is a direction which intersects a second direction corresponding to a conveyance direction in which the original is conveyed;

determine a second abnormal position which is a position in a first direction of an abnormal pixel of the second color in the image represented by the image data;

performing a correction processing for removing a streak image by correcting the image data;

wherein the at least one processor is configured to:

operate in a first reading mode in which the correction processing to the image data of the first color corresponding to the first abnormal position in the image represented by the image data and the correction processing is performed, regardless of presence or absence of the abnormal pixel of the second color, to the image data of the second color corresponding to the first abnormal position in the image represented by the image data; and operate in a second reading mode in which the correction processing is performed to the image data of the first color corresponding to the first abnormal position in the image represented by the image data and the correction processing is not performed to the image data of the second color corresponding to the first abnormal position in the image represented by the image data in a case where the abnormal pixel of the second color is not in the first abnormal position.

10. The image forming apparatus according to claim 9, wherein the at least one processor is configured to perform the first reading mode in a case where an image is formed on a sheet by the image forming apparatus based on a reading result by the reading unit.

* * * * *